(12) United States Patent
Schachter

(10) Patent No.: US 7,836,045 B2
(45) Date of Patent: Nov. 16, 2010

(54) CUSTOMIZING WEB SEARCH RESULTS BASED ON USERS' OFFLINE ACTIVITY

(75) Inventor: Erez Schachter, Brookline, MA (US)

(73) Assignee: Approximatch, Inc., Newton, MA (US)

( * ) Notice: Subject to any disclaimer, the term of this patent is extended or adjusted under 35 U.S.C. 154(b) by 223 days.

(21) Appl. No.: 11/651,415

(22) Filed: Jan. 9, 2007

(65) Prior Publication Data

US 2007/0185844 A1 Aug. 9, 2007

Related U.S. Application Data

(60) Provisional application No. 60/757,815, filed on Jan. 10, 2006.

(51) Int. Cl.
G06F 7/00 (2006.01)
G06F 17/30 (2006.01)

(52) U.S. Cl. .................................. 707/713; 707/758
(58) Field of Classification Search .................. None
See application file for complete search history.

(56) References Cited

U.S. PATENT DOCUMENTS

| | | | |
|---|---|---|---|
| 6,463,443 B1 * | 10/2002 | Thorner et al. | 707/104.1 |
| 6,519,571 B1 | 2/2003 | Guheen et al. | |
| 2003/0126119 A1 * | 7/2003 | Lin | 707/3 |
| 2005/0060417 A1 | 3/2005 | Rose | |
| 2005/0097188 A1 | 5/2005 | Fish | |
| 2005/0203799 A1 * | 9/2005 | Faber et al. | 705/14 |
| 2006/0004713 A1 | 1/2006 | Korte et al. | |
| 2006/0095473 A1 * | 5/2006 | Fox | 707/104.1 |
| 2006/0122978 A1 * | 6/2006 | Brill et al. | 707/3 |
| 2006/0200380 A1 | 9/2006 | Ho et al. | |
| 2007/0124288 A1 * | 5/2007 | Swanson et al. | 707/3 |
| 2007/0124297 A1 * | 5/2007 | Toebes | 707/5 |

FOREIGN PATENT DOCUMENTS

| | | |
|---|---|---|
| WO | WO 0127838 | 4/2001 |
| WO | WO 0215454 | 2/2002 |

OTHER PUBLICATIONS

Website: http://en.wikipedia.org/wiki/Pay_per_ranking, Pay per Ranking, Wikipedia, the free encyclopedia.
Website: http://en.wikipedia.org/wiki/Pay-per-call, Pay per call, Wikipedia, the free encyclopedia.
Website: http://en.wikipedia.org/wiki/Pay_per_click, Pay per click, Wikipedia, the free encyclopedia.

* cited by examiner

Primary Examiner—John R. Cottingham
Assistant Examiner—Michael Pham
(74) Attorney, Agent, or Firm—Zilka-Kotab, PC

(57) ABSTRACT

A method for improving web search results based on analysis of users' offline activities that are related to their online search. Web search results, including local search results, for a user may be improved by monitoring the actions of users when not interacting with the web search engine. By monitoring "offline" activities (e.g., telephone calls) and matching a person participating in an activity (e.g., the person making a telephone call) to a search engine user, a set of preferences for a given user may be determined, which may be used to select and sort web search results for that user. Preference data for one user may be used to select and sort web search results for other users, including those for which the search engine does not have preference data.

17 Claims, 6 Drawing Sheets

CUSTOMIZING WEB SEARCH RESULTS BASED ON USERS' OFFLINE ACTIVITY

RELATED APPLICATIONS

This application claims priority under 35 U.S.C. §119(e) to U.S. Provisional Application Ser. No. 60/757,815, entitled "METHOD FOR ENHANCED SEARCH OF INTERNET DIRECTORY INCORPORATING USER-SPECIFIC SEARCH AND CONTACT HISTORY," filed on Jan. 10, 2006, which is herein incorporated by reference in its entirety.

FIELD OF THE INVENTION

The present invention relates to determining results of a web search based in part on users' actions when not interacting with the web search engine.

BACKGROUND OF THE INVENTION

As more and more information is made accessible via the Internet, web search engines are becoming an increasingly important way for people to find out information in their everyday lives. The sheer volume of information available via the web, however, can make presenting relevant search results to users a very difficult problem, as more relevant search results may be lost among irrelevant results.

Local search engines are a form of web search engines that focus on providing to users lists of entities, including businesses and individuals, in a certain area—an electronic directory of businesses or individuals. User search terms include, for example, service/product types or business names and a geographic region, and the search engine returns to the user a list of businesses within the region along with contact information for the businesses (e.g., address, telephone number, web site, e-mail address, etc.). Due to the potentially large number and variety of businesses of a certain type in a given area (e.g., pizza restaurants), it can be difficult to select the business that best matches the user's preference, as expressed in his or her search query.

Various methods for selecting and sorting search results have therefore been used in conventional web search engines. The simplest methods are based on exact or almost exact textual matching of information items stored in the search engine data store to the terms of the user's query. An example of such a conventional method is shown in FIG. 1.

In block 100, users enter a search query into the search engine, and in block 102 the query is transmitted to the engine. In block 104, the search engine compares the user's search terms to its database and selects results to transmit to the user. In block 106, the user reviews the results and may take any number of actions, such as visiting a location associated with a search result (block 108), clicking on a hyperlink in the results to view a web page associated with a search result (block 110), or making a telephone call to an entity listed as or associated with a search result (block 112). The method of FIG. 1 cannot detect any such actions, however, and will keep providing results to users based on exact or approximate textual matching, which may include irrelevant results.

In the interest of improving search results, some conventional search engines attempt to understand what information a user was trying to find when he or she entered the search query by analyzing what the user does with the results. The method illustrated in FIG. 2 is an example of such a method that attempts to learn about its users by analyzing how they interact with the web page comprising the results of the web search.

Just as in FIG. 1, in block 200, users enter a search query into the search engine, and in block 202 the query is transmitted to the engine. In block 204, the search engine compares the user's search terms to its database and selects results to transmit to the user. In block 206, the user reviews the results and may take any number of actions, such as visiting a location listed as or associated with a search result (block 208), clicking a hyperlink in the results to view a web page associated with a search result (block 210), or making a telephone call to an entity listed as or associated with a search result (block 212). The method of FIG. 2, however, includes an additional block 214 that attempts to understand better the user's search query by analyzing the results selected by the user, determined by the hyperlinks clicked by the user. Information gathered during this method is then fed back to the result selection method of block 204 where it can be used in selecting and sorting search results to similar queries.

Methods such as that shown in FIG. 2, however, have been conventionally limited to analyzing the hyperlinks clicked by the user or other "online" information collected while the user interacts with the search engine's web page.

Some web sites do monitor offline activities of users, but do not do so in conjunction with improving search results. Pay-per-call advertising, for example, tracks the users who place calls to a business through listing a specific telephone number for the business in the advertisement that is associated only with that advertisement. It can be inferred, then, that every person calling that telephone number saw that advertisement. A web site may then charge the business a specific rate per call or may use the telephone call logs to negotiate higher prices for advertising. This information is typically used in advertising, however, and is not typically fed back to the search engine and used in selecting and sorting search results.

SUMMARY OF THE INVENTION

In one embodiment, there is provided a method comprising providing to a user of an electronic directory a web page comprising search results in response to a search query entered by the user and monitoring incoming telephone calls to an entity listed as or associated with a search result. The method collects data on the calling person, and determines if the user is the calling person. If so, at least one preference of the user is determined based at least in part on the telephonic interaction. This can be done, for example, by monitoring the online and telephonic interaction of the user with selected entities, because repeated telephone calls to certain entities can be indicative of the user's preference(s). Search results in response to subsequent search queries entered by any user are then selected and ordered based at least in part on the at least one preference of the monitored user.

In another embodiment, there is provided a computer apparatus comprising at least one computer-readable medium. The computer-readable medium is encoded with instructions for execution on a computer, wherein the instructions, when executed, perform a method. The method comprises collecting and storing information about a web search conducted by a user of an electronic directory, collecting and storing information about a telephone call made by a person to an entity listed as or associated with a search result, and comparing the information about the web search and the information about the telephone call to determine if the user is the person. The method determines at least one preference of the person based at least in part on telephonic interaction of the person with the destination of the telephone call. Results of a subsequent web search conducted by the user or another user are altered based on the at least one preference of the person.

In a further embodiment, there is provided a method comprising collecting a first information about actions of a user of an electronic directory while the user is interacting with the electronic directory and collecting a second information about at least one action of a person when not interacting with the web site. The method determines if the user is the person and, if so, determines at least one preference of the user based at least in part on the first information and the second information. Users' future interaction with the website are altered based upon the at least one preference of the user.

In another embodiment, there is provided a method. The method comprises collecting web search data about a user of an electronic directory, collecting telephone call data from at least one entity listed in the electronic directory, and establishing a monitored user by comparing the data about the user and the incoming telephone call data to determine a match between the user and a person calling the at least one entity. The method collects further web search data and further incoming telephone call data associated with the monitored user to determine preference data for the monitored user, including at least one preferred result for one web search query. The preference data is then used to select and rank order search results presented to all users of the electronic directory in response to search queries.

In a further embodiment, there is provided a method comprising receiving a web search query from a user of an electronic directory, and selecting and rank ordering results to provide to the user based at least in part on at least one preference determined for at least one prior user of the electronic directory. Determining the at least one preference for at least one prior user of the electronic directory comprises establishing a monitored user by comparing web search data associated with a prior user of the electronic directory and incoming telephone call data for at least one entity listed in the electronic directory to determine a match between the user and a person calling the at least one entity and collecting further web search data and further telephone call data associated with the monitored user to determine preference data for the monitored user, including at least one preferred result for one web search query. The preference data is then used to select and rank order search results presented to all users of the electronic directory in response to search queries.

DETAILED DESCRIPTION

Applicant has appreciated that having information regarding a user's preferences may be useful in selecting and ordering results presented to the user in response to a web search query, particularly in local searches. Such information may be used to eliminate irrelevant results that may have otherwise been included in search results, or may be used to highlight certain ones of the results for users. Conventional methods of collecting information regarding user preferences, however, have been limited in scope, as web search engines have only collected information from the users in conjunction with web searches. Applicant has therefore appreciated the desirability of monitoring offline actions of search engine users to determine preferences that may be used in determining search results.

In view of the foregoing, one embodiment of the present invention is directed to a method of determining user preferences by collecting information about the offline actions of a person, then matching that person to a user of the search engine. Embodiments of the invention may then use the monitored user preferences to select and sort results presented to any user of the search engine in response to a web search query.

Figure 1:
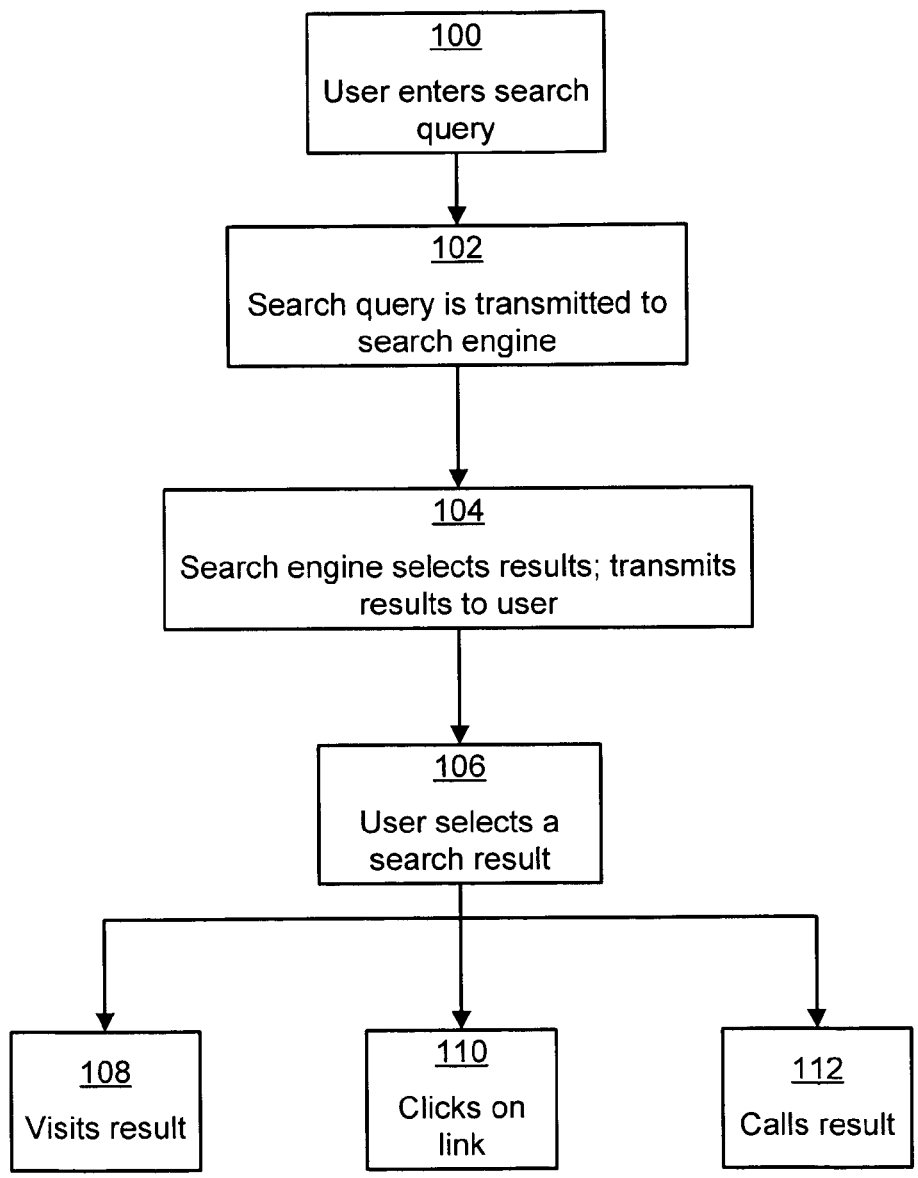
FIG. 1 is a flowchart of a first conventional method of providing results to a user of a web search engine.
Figure 2:
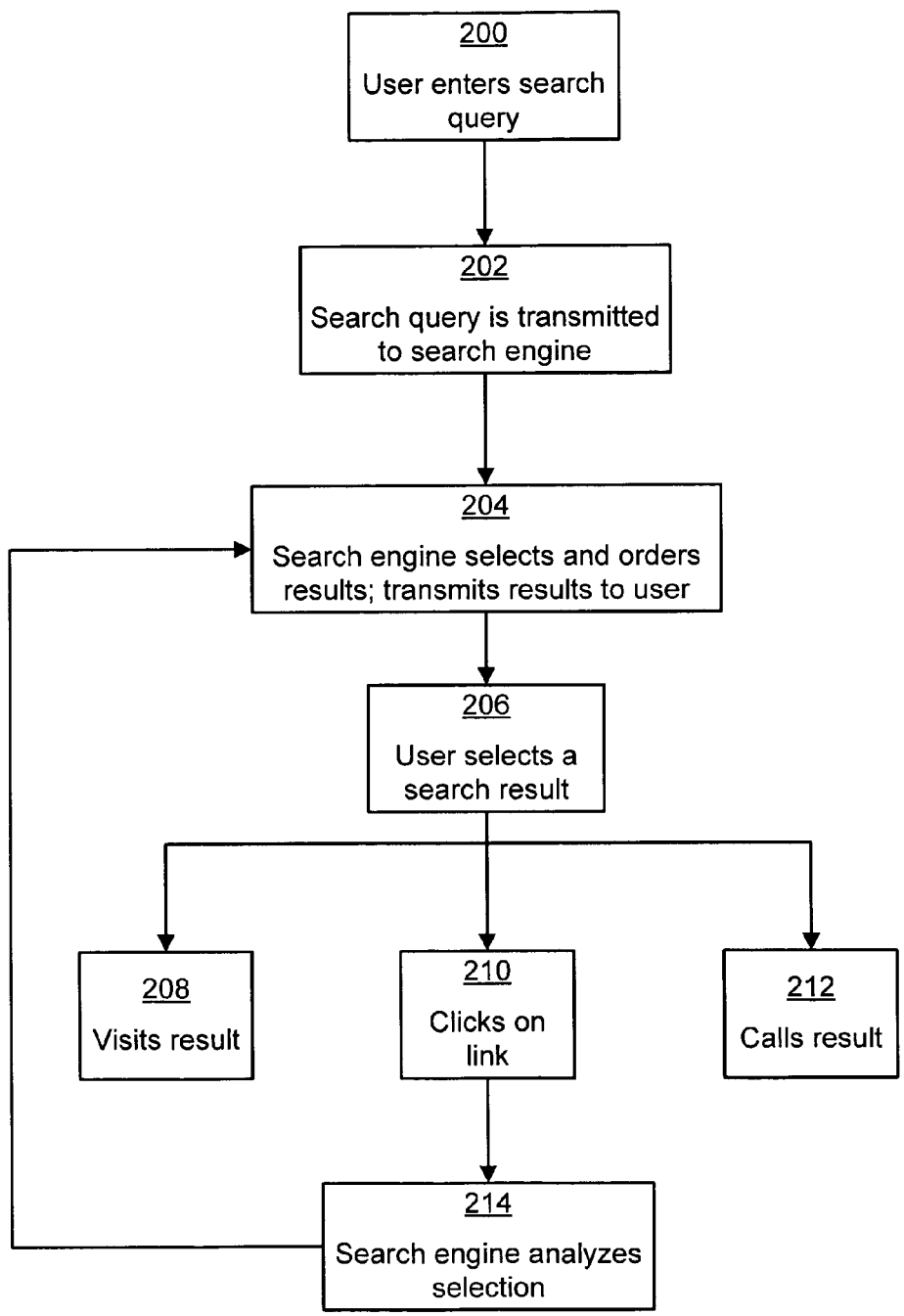
FIG. 2 is a flowchart of a second conventional method of providing results to a user of a web search engine.
Figure 3:
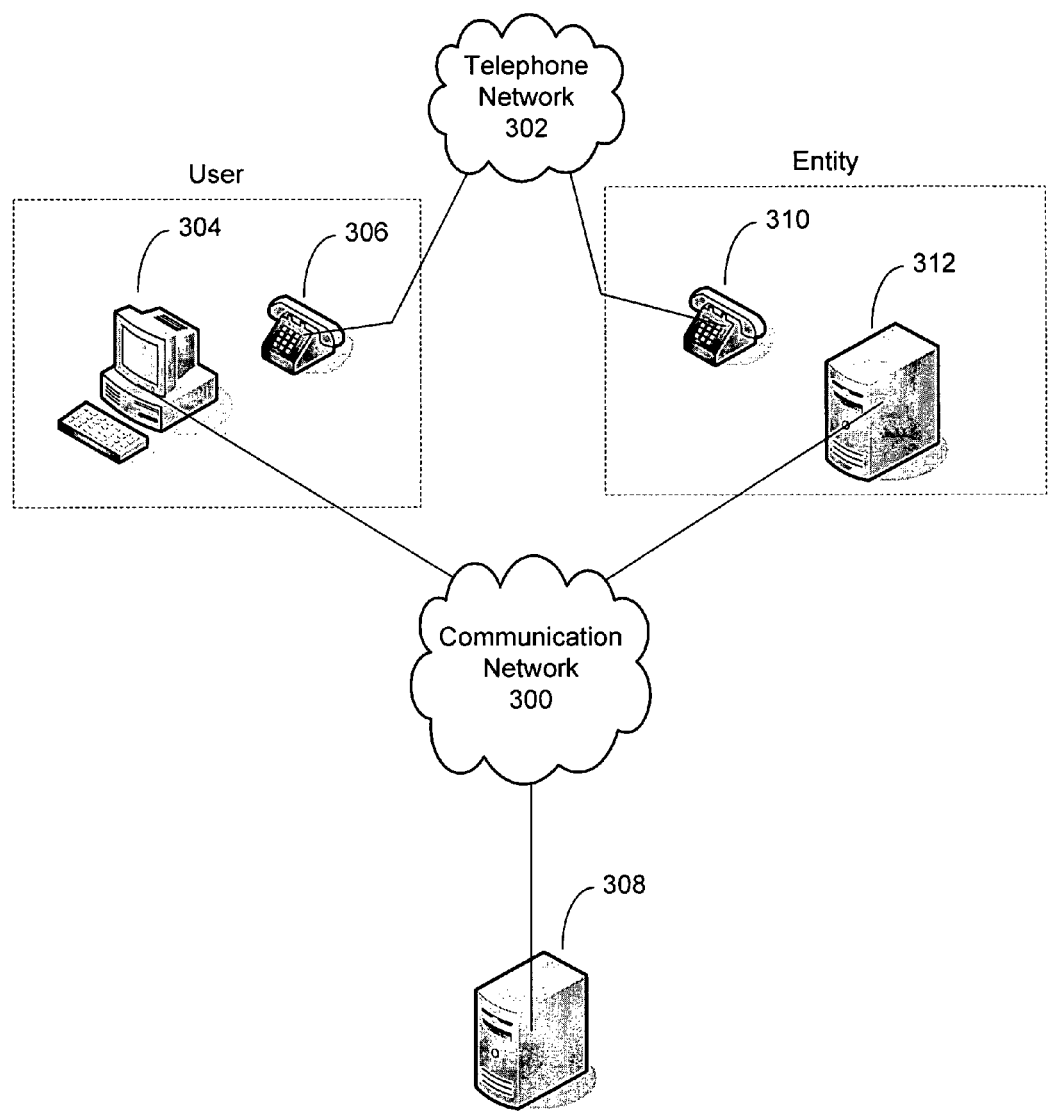
FIG. 3 is a diagram of an illustrative computer system environment in which embodiments of the invention may be implemented.

The aspects of the present invention described herein can be implemented on any of numerous computer system configurations and are not limited to any particular type of configuration. FIG. 3 illustrates one example of a computer system on which aspects of the invention can be implemented, although others are possible.

The computer system of FIG. 3 includes communication network 300, telephone network 302, user computer 304, server 308 on which a search engine is based, and server 312 on which a business' website is hosted. FIG. 3 further comprises a user telephone 304 and a business telephone 308. Communication network 300 can be any suitable wired and/or wireless communication medium or media for exchanging data between two or more computers (e.g., a server and a client), including the Internet. Telephone network 302 can be any suitable wired and/or wireless communication media or media for exchanging voice data between two or more telephones. User computer 304 can be any suitable computing device for sending and receiving data over a communication network, such as a desktop personal computer, a laptop personal computer, a personal digital assistant (PDA), a web-enabled television set (connected via cable, satellite, fiber, or any other suitable method), or a smart phone (including a mobile telephone), among others. Servers 308 and 312 can be any suitable computing device for sending data to and receiving data from one or more client computing devices over a communication network. Telephones 306 and 310 can be implemented as any suitable device for exchanging voice data between two points, such as traditional wired telephones or cellular telephones.

As mentioned above, the embodiments of the invention described herein are not limited to being practiced with the exemplary system shown in FIG. 3, and can be employed on systems employing any number of computing devices or any number of telephones. Server 308, for example, is shown as a single server, but may be implemented in some embodiments of the invention as a network of computers sharing processing and storage demand. In addition, while FIG. 3 shows telephone network 302 as separate from communication network 300, embodiments of the invention may operate using telephones that communicate over communication network 300, such as telephones employing Voice over Internet Protocol (VoIP). It should be further appreciated that while FIG. 3 illustrates telephones, embodiments of the invention may operate without telephones or without telephones that are distinct from computing devices (e.g., smart phones).

Additionally, while FIG. 3 shows telephone 308 and server 310 grouped together as an "entity," embodiments of the invention may operate in systems in which a telephone for an entity is in a different location from the server hosting the website for the entity, or in which an entity does not have a server hosting a website. Further, while FIG. 3 illustrates a user computer 304 as remote from server 308, in one embodiment of the invention the user computer 304 and the server 308 may be the same computing device.

Figure 4:
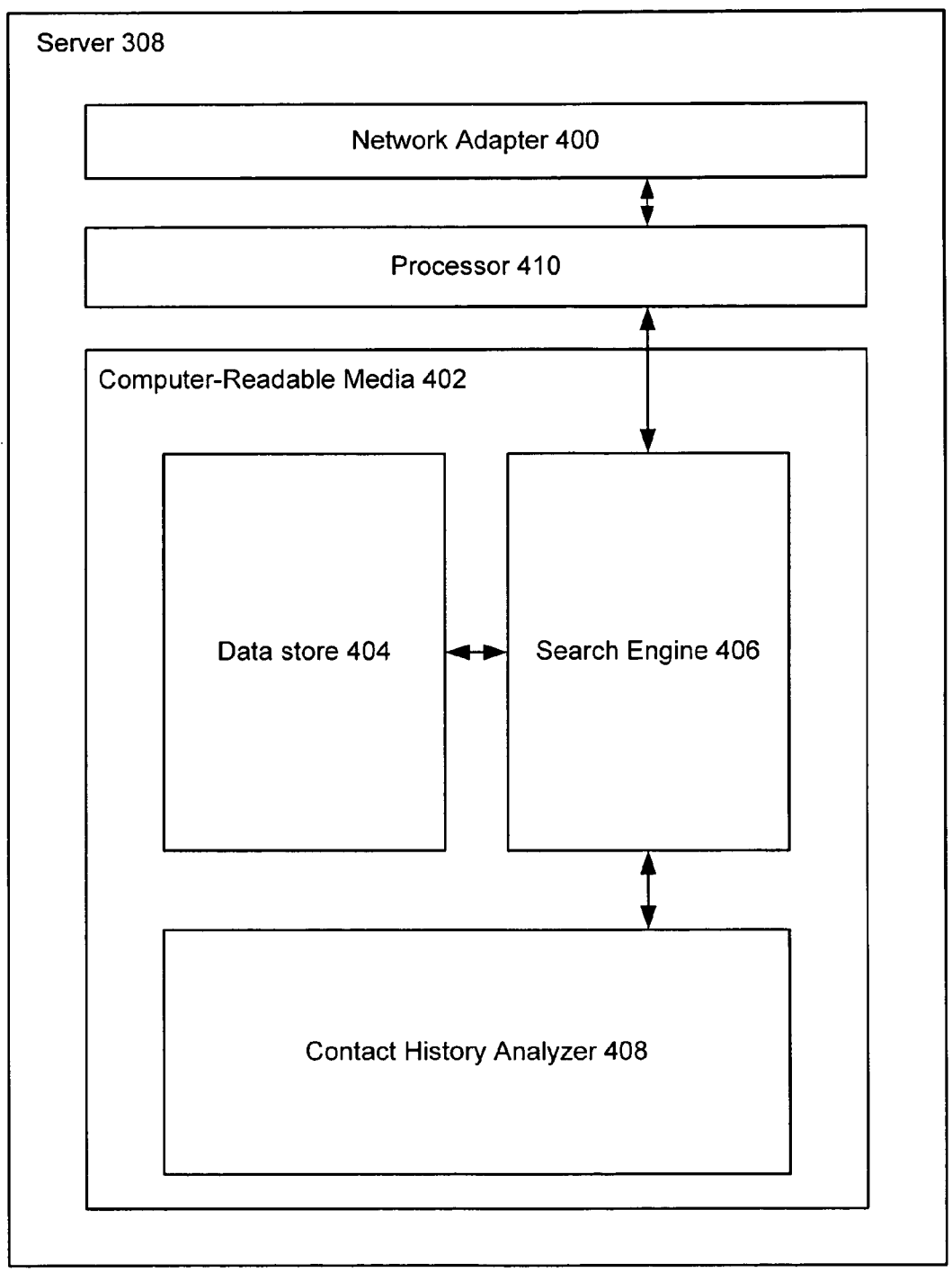
FIG. 4 is an exemplary server which may be used in accordance with embodiments of the invention.

FIG. 4 shows an illustrative server 308 that may be used in accordance with one or more embodiments of the invention. It should be appreciated that FIG. 4 is intended neither to be a depiction of necessary components for a computing device to operate as a server with embodiments of the invention, nor a comprehensive depiction. Server 308 comprises network adapter 400 to communicate with other devices connected to network 300, such as user computer 304. Server 308 also comprises computer-readable media 402 for storing data to be processed and/or instructions to be executed by a processor 410. Processor 210 enables processing of data and execution of instructions. The data and instructions may be stored on the computer-readable media 402 and may, for example, enable communication between components of the server 308.

In accordance with some embodiments of the invention, the data and instructions stored on computer-readable media 402 may comprise a data store 404 comprising information to be examined by a search engine 406 in response to a user search query received by network adapter 400. The data store 404 may comprise information of any type, including information on businesses such as business names, business types, addresses, phone numbers, web site addresses, and e-mail addresses. It should be appreciated that this list is merely illustrative, and embodiments of the invention may operate with search engines searching data stores comprising information of any type or types. Search engine 406 may be implemented in any suitable manner, as embodiments of the invention may operate with any search engine capable of examining a data store based on a query.

In one embodiment of the invention, search engine 406 may begin searching data store 404 for information relating to a query received from a user using both the query itself and other information known about the user and the query. Information about the user and the query may be stored in a contact history analyzer 408 stored on computer-readable media 402. Contact history analyzer 408 may be implemented in any suitable manner, examples of which are discussed below.

In one embodiment of the invention, contact history analyzer 408 collects and stores information concerning the "online" activities of users as users interact with the web page for the search engine. This online activity data is called web search data. This web search data may comprise any information that a server can collect while a user is interacting with its web page. For example, the web search data may comprise: an identification for a user, such as an identification stored in a Hypertext Transfer Protocol cookie stored on the user's computer, an identification for the computer the user is using to interact with the web page (e.g., an Internet Protocol address or a Medium Access Control address), or a username used by the user when using the web site; search queries entered by the user; times the search queries were entered by the user; results sent to the user in response to search queries; and results electronically selected by the user (e.g., results with associated hyperlinks clicked on by the user). It should be appreciated that this list is merely illustrative, and embodiments of the invention may operate a contact history analyzer storing any type or types of information.

In one embodiment of the invention, the contact history analyzer 408 collects and stores information on the "offline" activities of people. This information may comprise any type of information about people that is electronically storable. In embodiments of the invention, this offline activity information may comprise telephone calls made by people, purchases made by people (using, for example, credit cards), and/or locations visited by people. In addition, contact history analyzer 408 may store information on times of offline activities, lengths of the offline activities (e.g., length of a telephone call), origins of the offline activities (e.g., a telephone number from which a telephone call was made), and destinations of offline activities (e.g., a telephone number to which a telephone call was made). It should be appreciated that this list is merely illustrative, as embodiments of the invention may operate a contact history analyzer storing any type of information.

The information collected and stored by the contact history analyzer 408 may then be used in selecting and ordering search results for users of the search engine 404. An example of such a selecting and ordering method is shown in FIG. 5.

Figure 5:
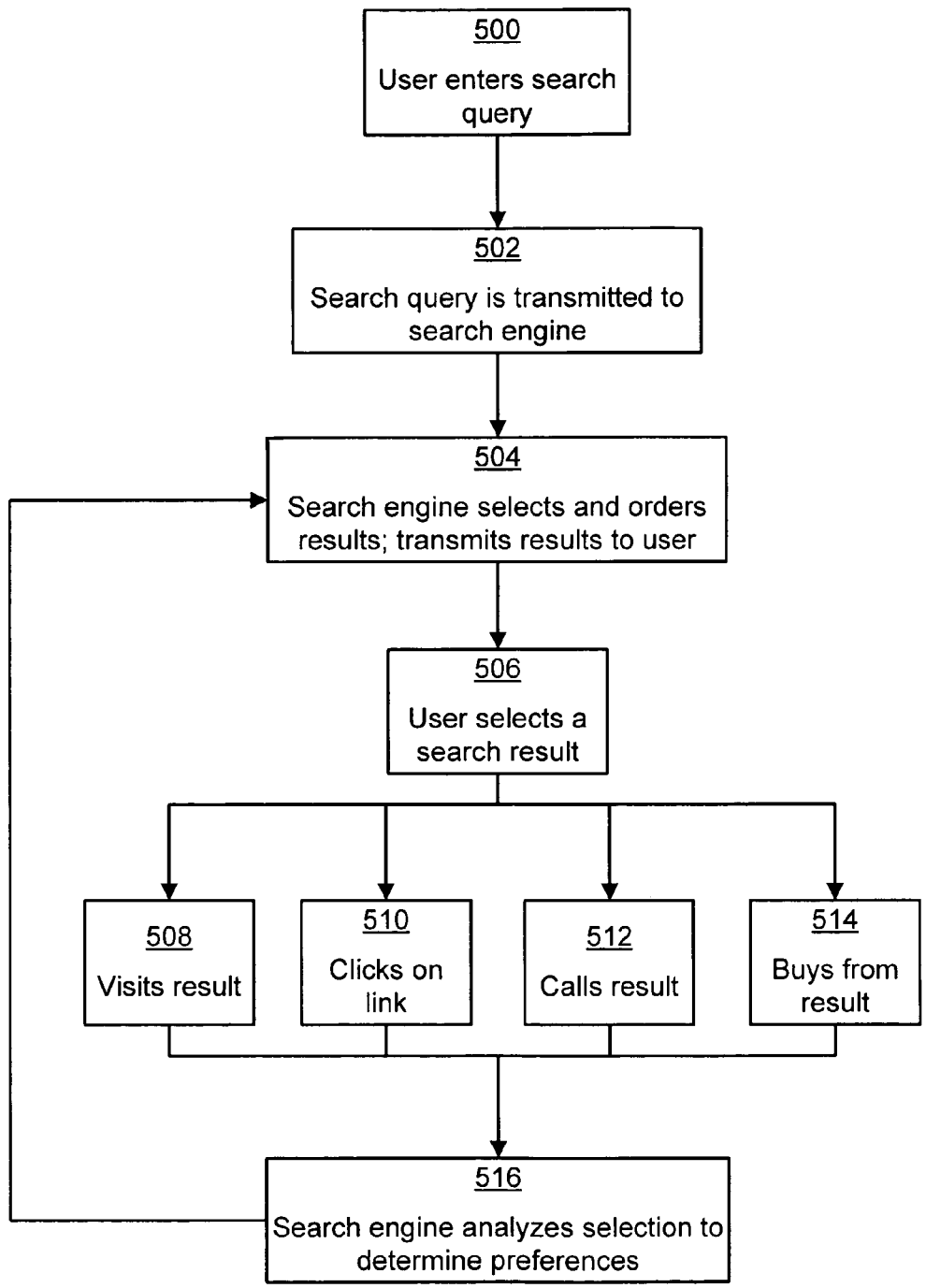
FIG. 5 is a flowchart of an illustrative method of providing results to a user of a web search engine and collecting information about a result selected by the user, in accordance with one embodiment of the invention.

FIG. 5 illustrates a flowchart of an exemplary method by which the invention will determine search results for a user in response to a search query. In block 500, users enter a search query into the web page associated with the search engine, and in block 502 the query is transmitted from user computer 304 to server 308, which hosts the search engine 406. In block 504, search engine 406 compares the user's search terms and the information it has about the user to data store 404 to select results to transmit to the user. In block 506, the user reviews the results and may make take any number of many types of actions. Exemplary actions are visiting a location associated with a search result (block 508), clicking a hyperlink in the results to view a web page hosted on server 312 and associated with a search result (block 510), making a telephone call to an entity associated with a search result from telephone 306 to telephone 310 (block 512), and/or buying goods or services from an entity associated with a search result (block 514). In embodiments of the invention, in block 516 information about one or more of these online and offline actions is then collected and analyzed by contact history analyzer 408 to determine further information about the user, such as preferences. This information may be used to improve the search results returned by search engine 406. This improvement of search results may be done in any suitable manner, examples of which are discussed in detail below.

It should be appreciated that the actions taken by users shown in FIG. 5 (blocks 508-514) are merely exemplary, and that users are able to take many actions in selecting a search result. In embodiments of the invention, contact history analyzer 408, in block 516, will be capable of monitoring and analyzing any number and any type of possible actions taken by users that are electronically traceable.

The contact history analyzer 408 may collect information about offline activities of users in any suitable manner. In one embodiment of the invention, electronic records of offline actions will be provided by service providers. For example, telephone call records could be provided by telephone companies, credit card records could be provided by credit card companies, locations visited by users could be provided by cellular telephone companies after being gathered from users' cellular phones, etc. In another embodiment of the invention, rather than or in addition to service providers, entities associated with a search result will provide electronic records. For example, incoming telephone call data logs (e.g., caller ID/Automatic Number Identification logs), credit card or personal check purchase records, or customer identification records may be preserved by an entity and provided to the contact history analyzer 408. Additionally, information on times of offline activities, lengths of the offline activities, origins of the offline activities, and destinations of offline activities may be collected. Embodiments of the invention are not limited to any specific technique for collecting information about offline activities of users, as any suitable technique may be used for gathering information.

In one embodiment of the invention, once the contact history analyzer 408 has web search data and offline activity data, it may match the former to the latter to determine whether a user of the search engine is the same person taking an offline action. Due to privacy concerns, for example, a telephone company may not be willing to provide a search engine operator with a list of a specific caller's records, but may be willing to provide a list of telephone calls for individuals identified by a code name or number, comprising the called number, the time of the call, and the length of the call, without providing any information that may be used to identify the caller. Such a code name or number could be substituted for the caller's name or number by the telephone company to prevent the calls from being traced to a particular person. Thus, a caller's name or number could become "XYZ," "111," or any other suitable unique symbol. The contact history analyzer may then compare this information to the web search data to look for patterns or trends.

For example, a user may search an electronic directory for a pizza restaurant in a certain area and receive a list of results including a listing for a pizza restaurant A. This information would be contained in the web search data (the online action data). The offline activity data may list a phone call from a certain telephone number to a telephone number associated with pizza restaurant A. The contact history analyzer 408 may then be able to hypothesize that the user is a person calling from the telephone number. Of course, it is possible that the contact history analyzer will have several matches for a user and a person/telephone number if many people enter the same search query or call the restaurant within a certain period of time, but with analysis of subsequent searches and calls, and using statistical techniques, the contact history analyzer 408 will be able to narrow the hypotheses to a single match to establish a "monitored user."

Figure 6:
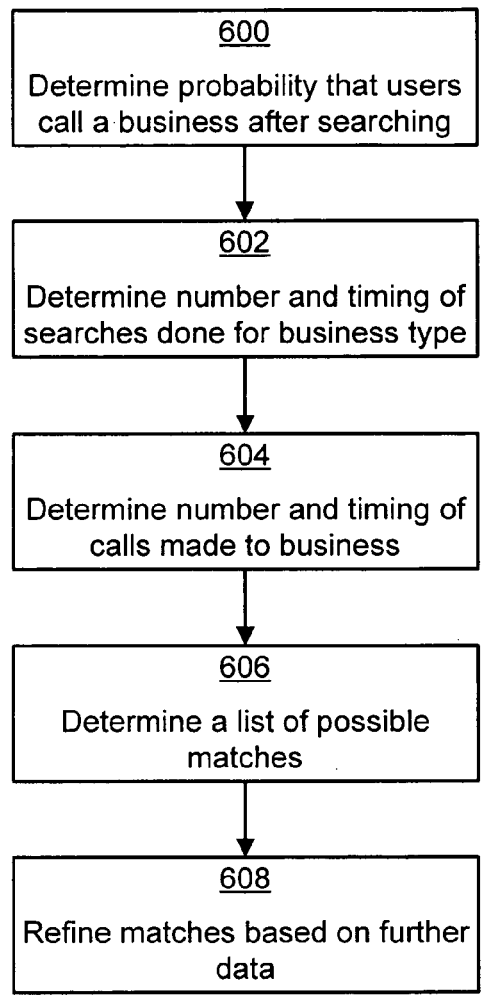
FIG. 6 is a flowchart of an illustrative method of matching a user of a web search engine to a person making a telephone call to establish a monitored user, in accordance with one embodiment of the invention.

An example of such a matching method is illustrated in FIG. 6. The method starts in block 600, wherein a probability that a user will call a business that he selected from a provided set of search results is determined. This probability could be determined in any suitable manner, such as based on the analysis of online activity of users as is done by conventional search engines or making an assumption that could be refined during implementation of the search engine based on online and offline user data. Typically, conventional local search engines have determined this value to be approximately five percent. Next, in block 602, the number and timing of searches for a particular business type in a certain region are determined, followed by the number and timing of calls made to a business in block 604. This data is then (in block 606) compared and analyzed to determine a list of possible matches.

The determination of block 606 can be done in any suitable manner. In an exemplary context, pizza restaurant A is presented to users of the search engine 406 20 times in 20 minutes, and pizza restaurant A receives 10 calls in that same 20 minute period. Based on the previously-assumed five percent selection rate, it can be determined that of the 20 times pizza restaurant A was provided to a user as a search result, it was selected and followed by a phone call once by a user, and therefore one of those 10 calls came from a user of the search engine 406. Therefore, the group of 20 users of the search engine 406 during that 20-minute time period has a 10 percent chance of making one of the 10 calls to pizza restaurant A. It should be appreciated that the 20-minute time period is merely exemplary, as any suitable time window can be used in accordance with embodiments of the invention. This list of possible matches is further narrowed in block 608 through subsequent analysis of further data. For example, a further set of searches and calls may result in a second group of users having a 10 percent chance of being a second set of callers. Some of these users or callers may match users or callers from the first determined set, and some may not, and by comparing these lists possibly false matches may be eliminated and possibly correct matches may be reinforced. By calculating further possible matches and comparing those matches to existing possible matches, more certainty in a match can be established. Once enough sets of matches have been collected, a single user may be determined to match a single caller with enough probability to determine the match to be a correct.

While FIG. 6 shows techniques for matching within the context of matching a single user to a single person to establish a monitored user, embodiments of the invention will be able to detect multiple matches between users and persons. For example, a single telephone number may be matched with multiple online addresses, as a person may use the same telephone for all personal telephone calls (e.g., cellular telephone), but may use one computer at work and a second computer at home. In addition, multiple telephone numbers could be matched to a single person, such as when a person has a single computer at home but has both a traditional "land line" telephone and a cellular telephone. It should therefore be appreciated that embodiments of the invention are not limited to determining a one-to-one correlation between a user determined from web search data and a person determined from offline action data.

It should also be appreciated that while FIG. 6 illustrates a method comparing user web search data to telephone numbers from incoming or outgoing telephone call logs, any 'suitable technique or combination of techniques for matching a user to a person may be used. For example, contact history analyzer 408 may examine characteristics of a user's search query and characteristics of an entity with which a person interacted (e.g., a user search on a local search engine for "deep dish pizza" followed by a telephone call to a business entity that serves deep dish pizza).

Further, it should be appreciated that in one embodiment of the invention, users will be able to volunteer to be monitored users by providing identifying information to the contact history analyzer 408. For example, a user may enter his or her telephone number(s) into the search engine's web page, and thereby provide the contact history analyzer 408 with information to determine a match between a user and a person, rather than relying on the contact history analyzer to determine a match over time.

Once the contact history analyzer 408 has established a monitored user, it will be able to further track subsequent searches or offline activities of the user to determine preferences for the user. For example, the user in the example above calling pizza restaurant A may call pizza restaurant A several times a month, or may always call pizza restaurant A after conducting a search using the local search engine for pizza restaurants in a certain region. The contact history analyzer may then be able to determine that the user prefers pizza restaurant A over other pizza restaurants, and that pizza restaurant A is a good search result for a particular search query (or queries) in a particular geographic region.

Determination of monitored user preferences may be done in any suitable manner. In one embodiment of the invention, preferences may be determined by examining telephone records following a particular search query by the monitored user to look for repeat actions associated an entity associated with a search result. In an alternative embodiment of the invention, the contact history analyzer 408 will examine a monitored user's telephone records without looking for immediately-associated search queries (e.g., if the user calls without first searching).

Once a monitored user has called, shopped at, visited, or in any other suitable way interacted with an entity associated with a search result a certain threshold number of times, in one embodiment of the invention the contact history analyzer may determine that the monitored user prefers that entity over other entities of the same type. It should be appreciated that this determination may be done in any suitable manner. Embodiments of the invention may compare a length of a specific offline activity (e.g., length of a telephone call) or frequency of an offline activity (e.g., number of telephone calls or visits to the entity per month) to threshold values to determine a preference for a monitored user. In one embodiment of the invention, a preference may be determined by comparing the number of times a monitored user has interacted with an entity of a specific type relative to the number of times the monitored user has interacted with other entities of the specific type. A monitored user may also be determined, in accordance with one embodiment of the invention, to have multiple preferred entities of a specific type, or a preference for each of multiple types of entities.

It should also be appreciated that while preferences for specific entities has been described, embodiments of the invention may determine any suitable type of preference for a monitored user. For example, the contact history analyzer 408 may detect that a monitored user prefers to visit entities within a certain geographic region or may determine that the monitored user prefers entities of a specific type or types within one region and entities of other types within another region. In one embodiment of the invention, the contact history analyzer 408 may detect that a monitored user prefers entities having certain characteristics (e.g., independent businesses rather than chain businesses). In another embodiment of the invention, the contact history analyzer 408 may determine multiple sets of preferences based on time of day (e.g., a monitored user may prefer certain entities when at work, and other entities when at home), day of the week (e.g., a monitored user may prefer certain entities during the weekend and others during the week), or time of year (e.g., a monitored user may prefer certain entities during the summer and others during the winter). Embodiments of the invention may be capable of detecting any preference that is electronically traceable.

Once a preference is determined for a monitored user, that preference may be used, in accordance with one embodiment of the invention, in determining results to provide to the monitored user when a search query is entered into the search engine 406. For example, if a monitored user is determined to prefer pizza restaurant A and subsequently searches for pizza restaurants in the certain area, the search engine 406 may return a set of search results to the monitored user with pizza restaurant A at the top of the list. In addition, if a monitored user searches for pizza restaurants within a different area, the search engine 406 may, in some embodiments of the invention, find in the data store 404 a pizza restaurant offering a similar product to that offered by pizza restaurant A (e.g., deep dish pizza) and return that restaurant at the top of the list of search results.

Additionally, preferences determined for monitored users may be used in determining search results to provide to unmonitored users. For example, the contact history analyzer 408 may not have any preference information available for a first-time user of the search engine 404, but if the first-time user searches for pizza restaurants within the same region searched by the monitored user above, the search engine may return pizza restaurant A at the top of the list because it has determined that at least one of the monitored users prefers that entity in that area. Further, if multiple monitored users have preferred entities within a given area, the search engine may return to an unmonitored user a list including results sorted by the number of monitored users preferring a specific entity.

In one embodiment of the invention, monitored users' preferences may be sorted by the strength of a preference. For example, a monitored user having multiple determined preferred entities of a given type may be determined to have a weaker preference than a monitored user only having one determined preferred entity of that type.

It should also be appreciated that, in some embodiments of the invention, preferences, including strong and weak preferences, may "evolve" over time as a person's preferences evolve. For example, a new pizza restaurant may open in a monitored user's neighborhood that he or she prefers over his or her previous preferred restaurant. In one embodiment of the invention, if a monitored user switches from one strong preference to another strong preference for a given type of entity, the latter strong preference may be treated as a stronger preference than others. This may be done because a strong preference is typically hard to change, and it can therefore be inferred that the monitored user enjoys the new preferred entity much more than the previous preferred entity.

In addition, embodiments of the invention may use preference data determined for other monitored users in selecting and ordering results to provide to another monitored user. For example, the search engine may return a monitored user's preferred entity at the top of a list of search results, but may also place a second monitored user's preferred entity in the list (e.g., second in the list).

Additionally, in one embodiment of the invention, if a monitored user is determined to have a weak preference for a given type of entity while another monitored user (or monitored users) has a strong preference for the type of entity, the preference of the other monitored user may be ranked above the preference of the monitored user in the search results provided to the monitored user.

User preference data may also be used, in accordance with one embodiment of the invention, in determining advertising to provide to a monitored user as part of the search results. Context-specific advertising (i.e., advertising linked to the type of search query the user entered into the search engine) is one way that search engines provide search result information to the user in an attempt to answer the user's question as contained in the search query. Having more information about the user, therefore, can help in determining what kind of advertising should be presented to the user. For example, a local search engine knowing that a monitored user prefers pizza restaurant A may return to the user an advertisement for a similar pizza restaurant B along with other search results which include a listing for pizza restaurant A. In accordance with one embodiment of the invention, an entity may request that the search engine provide a specific advertisement to all monitored users who prefer its product(s).

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method comprising:

providing to a user of an electronic directory a web page comprising search results in response to a search query entered by the user of the electronic directory;

electronically monitoring telephone calls to an entity associated with a search result and collecting data on a calling person;

determining, by a computer, if the user of the electronic directory is the calling person by comparing a time the search query was entered by the user of the electronic directory and a time a telephone call was made by the calling person and, if so, determining at least one preference of the user of the electronic directory based at least in part on a telephonic interaction between the calling person and the called entity; and selecting and ordering search results in response to subsequent search queries entered by any user of the electronic directory based at least in part on the at least one preference of the user of the electronic directory who is the calling person in a way to allow for different search results being provided in response to the subsequent search queries;

wherein determining if the user of the electronic directory is the calling person further includes comparing time and origin of contact information for the search query and the telephone call and an identification for the user of the electronic directory and an identification for the calling person;

wherein determining if the user of the electronic directory is the calling person is based on a pattern determined via a comparison of a code name for the calling person with the identification of the user of the electronic directory, the code name for the calling person provided by a service provider via which the telephone calls are performed and utilized by the service provider for maintaining an anonymity of the calling person.

2. The method of claim 1, wherein determining if the user of the electronic directory is the calling person comprises comparing the search query entered by the user of the electronic directory to characteristics of a destination of the telephone call made by the calling person.

3. The method of claim 1, wherein determining at least one preference of the user of the electronic directory who is the calling person comprises comparing at least one of a length of the telephone call to the entity, a number of telephone calls made to the entity by the user of the electronic directory, and a frequency, of telephone calls made to the entity by the user of the electronic directory to threshold values.

4. The method of claim 1, wherein the search query comprises a search for entities within a geographic region of interest to the user of the electronic directory.

5. A non-transitory computer readable storage medium storing a computer program product, comprising:
  computer code for collecting and storing information about a web search conducted by a user of an electronic directory;
  computer code for collecting and storing information about a telephone call made by a calling person to an entity associated with a search result;
  computer code for comparing the information about the web search conducted by the user of the electronic directory and the information about the telephone call made by the calling person to determine if the user of the electronic directory is the calling person by comparing a time the web search was entered by the user of the electronic directory and a time the telephone call was made by the calling person;
  computer code for determining at least one preference of the calling person based at least in part on telephonic interaction of the calling person with the destination of the telephone call; and
  computer code for altering results of a subsequent web search conducted by the user of the electronic directory or another user of the electronic directory based on the at least one preference of the calling person including selecting and ordering the results in a way to allow for different search results being provided in response to the subsequent web search;
  wherein the computer program product is configured such that comparing the information about the web search conducted by the user of the electronic directory and the information about the telephone call made by the calling person comprises comparing time and origin of contact information for the web search and the telephone call and an identification for the user of the electronic directory and an identification for the calling person;
  wherein the computer program product is configured such that determining if the user of the electronic directory is the calling person is based on a pattern determined via a, comparison of a code name for the calling person with the identification of the user of the electronic directory, the code name for the calling person provided by a service provider via which the telephone calls are performed and utilized by the service provider for maintaining an anonymity of the calling person.

6. The computer readable storage medium of claim 5, wherein the information about the web search comprises at least one of the identification for the user of the electronic directory, the time the web search was entered, search terms entered by the user of the electronic directory, a set comprising results of the web search provided to the user of the electronic directory, or a subset of the set comprising results selected by the user of the electronic directory.

7. The non-transitory computer readable storage medium of claim 5, wherein the information about the telephone call comprises at least one of the identification for the calling person, the time of the telephone call, a length of the telephone call, or a dialed number for the call.

8. The computer readable storage medium of claim 5, wherein determining at least one preference of the calling person comprises comparing at least one of a length of a telephone call to an entity identified by the search result, a number of telephone calls made to the entity by the user of the electronic directory, and a frequency of telephone calls made to the entity by the user of the electronic directory to threshold values.

9. The computer readable storage medium of claim 5, further comprising computer code for altering the results of a web search conducted by a second user of the electronic directory based on comparing the information about the web search and the information about the telephone call.

10. A method comprising:
  electronically collecting a first information about actions of a user of an electronic directory while the user of the electronic directory is interacting with a website of the electronic directory;
  electronically collecting a second information about at least one action of a calling person when not interacting with the web site, wherein the at least one action of the calling person comprises a telephone call to an entity;
  determining, by a computer, if the user of the electronic directory is the calling person by comparing a time of the actions of a user of an electronic directory and the time a telephone call was made by the calling person and, if the user of the electronic directory is the calling person who made the telephone call, determining at least one preference of the user of the electronic directory who is the calling person that made the telephone call based at least in part on the first information and the second information; and
  altering users' of the electronic directory future interactions with the website including selecting and ordering search results in a way to allow for different search results being provided in response to a search query based upon the at least one preference of the user of the electronic directory who is the calling person that made the telephone call;
  wherein determining if the user is the calling person further comprises comparing time and origin of contact information for the actions of the user of the electronic directory and the telephone call made by the calling person and an identification for the user of the electronic directory and an identification for the calling person;
  wherein determining if the user is the calling person is based on a pattern determined via a comparison of a code name for the calling person with the identification of the user of the electronic directory, the code name for the calling person provided by a service provider via which the telephone calls are performed and utilized by the service provider for maintaining an anonymity of the calling person.

11. The method of claim 10, wherein the second information comprises electronic records of the at least one action of the user of the electronic directory when not interacting with the web site.

12. The method of claim 11, wherein the at least one action is a telephone call made by the user of the electronic directory, a purchase using a credit card made by the user of the electronic directory, or a location visited by the user of the electronic directory.

13. The method of claim 12, wherein the second information comprises the time and origin of the contact information.

14. The method of claim 12, wherein determining at least one preference of the user of the electronic directory comprises comparing at least one of a length of the at least one action of the user of the electronic directory with regard to an entity identified by the search result, a number of actions of the at least one action, and a frequency of actions of the at least one action to threshold values.

15. The method of claim 1, wherein the information about the web search comprises the identification of the user of the electronic directory, the identification of the user of the electronic directory determined using a hypertext transfer protocol cookie stored on a computer used by the user of the electronic directory to perform the search query.

16. The method of claim 1, wherein the information about the web search comprises the identification of the user of the electronic directory, the identification of the user of the electronic directory determined using a username utilized by the user of the electronic directory when using a web site.

17. The method of claim 1, wherein the search results are ordered based on a strength of a preference of the user of the electronic directory who is the calling person that made the telephone call associated with each of the search results.

* * * * *

UNITED STATES PATENT AND TRADEMARK OFFICE
CERTIFICATE OF CORRECTION

PATENT NO. : 7,836,045 B2
APPLICATION NO. : 11/651415
DATED : November 16, 2010
INVENTOR(S) : Erez Schachter It is certified that error appears in the above-identified patent and that said Letters Patent is hereby corrected as shown below:

In the claims:

Claim 1, col. 12, line 48; please replace "so" with -- if the user of the electronic directory is the calling person --;

Claim 1, col. 12, line 61; please replace "query and" with -- query of the user of the electronic directory --;

Claim 1, col. 12, line 62; please replace "call" with -- call made by the calling person --;

Claim 5, col. 13, line 53; please replace "search" with -- search of the user of the electronic directory --;

Claim 5, col. 13, line 53; please replace "call" with -- call made by the calling person --;

Claim 5, col. 13, line 58; please replace "via a," with -- via a --;

Claim 6, col. 13, line 65; please insert -- non-transitory -- after "The" and before "computer";

Claim 6, col. 14, line 4; please replace "set comprising" with -- set of the results of the web search comprising --;

Claim 8, col. 14, line 11; please insert -- non-transitory -- after "The" and before "computer";

Claim 8, col. 14, line 12; please replace "determining at" with -- determining the at --;

Claim 9, col. 14, line 19; please insert -- non-transitory -- after "The" and before "computer".

Signed and Sealed this
Nineteenth Day of February, 2013

Teresa Stanek Rea
*Acting Director of the United States Patent and Trademark Office*